(12) United States Patent
Wang et al.

(10) Patent No.: US 11,840,628 B2
(45) Date of Patent: Dec. 12, 2023

(54) RESIN COMPOSITION AND ARTICLE MADE THEREFROM

(71) Applicant: Elite Material Co., Ltd., Taoyuan (TW)

(72) Inventors: Rongtao Wang, Kunshan (CN); Zhenfang Shang, Kunshan (CN); Ningning Jia, Kunshan (CN)

(73) Assignee: ELITE MATERIAL CO., LTD., Taoyuan (TW)

( * ) Notice: Subject to any disclaimer, the term of this patent is extended or adjusted under 35 U.S.C. 154(b) by 65 days.

(21) Appl. No.: 17/497,359

(22) Filed: Oct. 8, 2021

(65) Prior Publication Data

US 2023/0055543 A1  Feb. 23, 2023

(30) Foreign Application Priority Data

Jul. 21, 2021 (CN) .......................... 202110823894.4

(51) Int. Cl.
C08L 65/02 (2006.01)
C08J 5/24 (2006.01)

(52) U.S. Cl.
CPC ............... C08L 65/02 (2013.01); C08J 5/249 (2021.05); C08J 2365/02 (2013.01); C08J 2409/00 (2013.01); C08J 2409/06 (2013.01); C08L 2205/03 (2013.01)

(58) Field of Classification Search
CPC ........ C08L 71/12; C08L 71/126; C08L 53/02; C08L 53/025; C08K 5/34; C08K 5/3412; C08K 5/3415; C08K 5/3417; C08K 5/3432; C08K 5/3435; C08K 5/3437
See application file for complete search history.

(56) References Cited

U.S. PATENT DOCUMENTS

2009/0246518 A1\* 10/2009 Fujimura .............. B32B 27/306
  428/339
2022/0356289 A1\* 11/2022 Wada ..................... C08G 65/38

FOREIGN PATENT DOCUMENTS

| JP | 2009013261 A | \* | 1/2009 |
| JP | 2010111758 A | \* | 5/2020 |
| WO | WO 2021/060181 | \* | 1/2021 |

OTHER PUBLICATIONS

JP 2010111758 A machine translation (May 2020).\*
JP 2009013261 A machine translation (Jan. 2009).\*

\* cited by examiner

*Primary Examiner* — Ana L. Woodward
(74) *Attorney, Agent, or Firm* — MUNCY, GEISSLER, OLDS & LOWE, P.C.

(57) ABSTRACT

A resin composition includes 100 parts by weight of an unsaturated C=C double bond-containing polyphenylene ether resin; 15 parts by weight to 40 parts by weight of a hydrogenated styrene-butadiene-styrene triblock copolymer; 1 part by weight to 20 parts by weight of a compound of Formula (1); and 0.001 part by weight to 0.5 part by weight of a compound of Formula (2), a compound of Formula (3), a compound of Formula (4) or a combination thereof. Moreover, an article may be made from the resin composition, including a prepreg, a resin film, a laminate or a printed circuit board.

Formula (1)

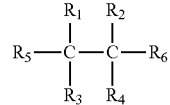

13 Claims, 1 Drawing Sheet

RESIN COMPOSITION AND ARTICLE MADE THEREFROM

CROSS-REFERENCE TO RELATED APPLICATION

This application claims the priority benefits of China Patent Application No. 202110823894.4, filed on Jul. 21, 2021. The entirety the above-mentioned patent application is hereby incorporated by reference herein and made a part of this specification.

BACKGROUND

1. Field of the Disclosure

The present disclosure relates to a resin composition and an article made therefrom, more particularly to a resin composition useful for preparing a prepreg, a resin film, a laminate or a printed circuit board.

2. Description of Related Art

With the rapid advancement of the fifth generation mobile communication technology (5G), resin materials suitable for data transmission at high frequency and high speed have become the mainstream of laminate development, which requires low dissipation factor of laminate materials even at high temperature variation and high humidity variation, so as to make laminates operable normally in a high temperature and high humidity environment. Therefore, there is a need for developing materials suitable for a high performance laminate.

SUMMARY

To overcome the problems of prior arts, particularly one or more above-mentioned property demands facing conventional resin materials, it is a primary object of the present disclosure to provide a resin composition so as to achieve one or more desirable properties including a high glass transition temperature, a low difference rate of dissipation factor caused by thermal aging, a low difference rate of dissipation factor caused by moisture and heat, laminate appearance without dry board and high laminate thickness evenness.

To achieve the above-mentioned objects, the present disclosure provides a resin composition, comprising:
(A) 100 parts by weight of an unsaturated C=C double bond-containing polyphenylene ether resin;
(B) 15 parts by weight to 40 parts by weight of a hydrogenated styrene-butadiene-styrene triblock copolymer;
(C) 1 part by weight to 20 parts by weight of a compound of Formula (1); and
(D) 0.001 part by weight to 0.5 part by weight of a compound of Formula (2), a compound of Formula (3), a compound of Formula (4) or a combination thereof;

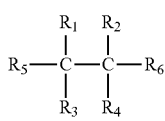

Formula (1)

wherein $R_1$ to $R_4$ are independently a hydrogen atom, a C1-C3 alkyl group, a phenyl group or a C1-C3 alkyl group-substituted phenyl group; and $R_5$ and $R_6$ are independently a phenyl group or a C1-C3 alkyl group-substituted phenyl group;

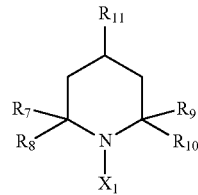

Formula (2)

wherein $X_1$ is an oxygen radical or a hydroxyl group; $R_7$ to $R_{10}$ are independently a hydrogen atom or a C1-C5 alkyl group, and $R_7$ to $R_{10}$ are not a hydrogen atom at the same time; and $R_{11}$ is a hydrogen atom, a methyl group, an amino group, a hydroxyl group, a carbonyl group or a carboxyl group;

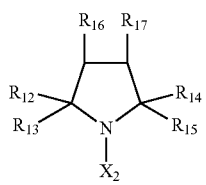

Formula (3)

wherein $X_2$ is an oxygen radical or a hydroxyl group; $R_{12}$ to $R_{15}$ are independently a hydrogen atom or a C1-C5 alkyl group, and $R_{12}$ to $R_{15}$ are not a hydrogen atom at the same time; and $R_{16}$ and $R_{17}$ are independently a hydrogen atom, a methyl group, an amino group, a hydroxyl group, a carbonyl group or a carboxyl group, or $R_{16}$ and $R_{17}$, together define a benzene ring structure;

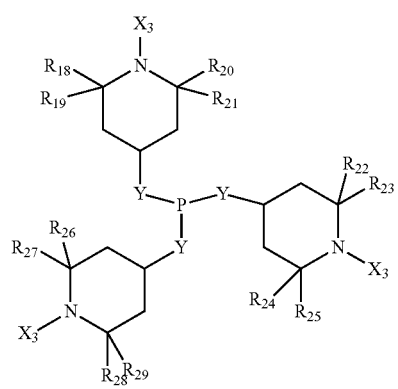

Formula (4)

wherein $X_3$ each independently is an oxygen radical or a hydroxyl group; Y is an oxygen atom or a phenylene group; and $R_{18}$ to $R_{29}$ are independently a hydrogen atom or a C1-C5 alkyl group, and $R_{18}$ to $R_{29}$ are not a hydrogen atom at the same time.

For example, in one embodiment, the unsaturated C=C double bond-containing polyphenylene ether resin comprises a vinylbenzyl-containing biphenyl polyphenylene ether resin, a methacrylate-containing polyphenylene ether resin, a vinylbenzyl-containing bisphenol A polyphenylene ether resin, a chain-extended vinyl-containing polyphenylene ether resin or a combination thereof.

For example, in one embodiment, the hydrogenated styrene-butadiene-styrene triblock copolymer comprises an unsubstituted hydrogenated styrene-butadiene-styrene triblock copolymer, a maleic anhydride-substituted hydrogenated styrene-butadiene-styrene triblock copolymer or a combination thereof.

For example, in one embodiment, the resin composition further comprises triallyl isocyanurate in an amount of such as 5 parts by weight to 25 parts by weight.

For example, in one embodiment, the resin composition further comprises inorganic filler, curing accelerator, solvent, flame retardant, silane coupling agent, coloring agent, toughening agent, core-shell rubber or a combination thereof. For example, in one embodiment, relative to 100 parts by weight of the unsaturated C=C double bond-containing polyphenylene ether resin, the amount of the inorganic filler may be 10 parts by weight to 300 parts by weight. For example, relative to 100 parts by weight of the unsaturated C=C double bond-containing polyphenylene ether resin, the amount of the inorganic filler may be 100 parts by weight to 200 parts by weight, but not limited thereto. For example, in one embodiment, the amount of the solvent is not particularly limited and may be adjusted according to the viscosity required for the resin composition. For example, in one embodiment, in the resin composition disclosed herein, exclusive of inorganic filler and solvent, the amount of flame retardant, curing accelerator, silane coupling agent, coloring agent, toughening agent or core-shell rubber may be, relative to 100 parts by weight of the unsaturated C=C double bond-containing polyphenylene ether resin, 0.01 part by weight to 150 parts by weight, such as but not limited to 0.01 part by weight to 3 parts by weight, 30 parts by weight to 80 parts by weight or 50 parts by weight to 150 parts by weight.

Another main object of the present disclosure is to provide an article made from the aforesaid resin composition, comprising a prepreg, a resin film, a laminate or a printed circuit board.

For example, in one embodiment, articles made from the resin composition disclosed herein have one, more or all of the following properties:

a glass transition temperature as measured by reference to IPC-TM-650 2.4.24.4 of greater than or equal to 180° C.:

a difference rate of dissipation factor (i.e., difference rate of dissipation factor caused by thermal aging) of less than or equal to 90% calculated according to a dissipation factor as measured by reference to JIS C2565 at 10 GHz after being subject to standing still at 188° C. for 48 hours;

a difference rate of dissipation factor (i.e., difference rate of dissipation factor caused by moisture and heat) of less than or equal to 30% calculated according to a dissipation factor as measured by reference to JIS C2565 at 10 GHz after being subject to standing still at 85° C. and a relative humidity of 85% for 48 hours; and article such as laminate without dry board as observed by naked eyes and without thickness unevenness.

DESCRIPTION OF THE EMBODIMENTS

Figure 1:
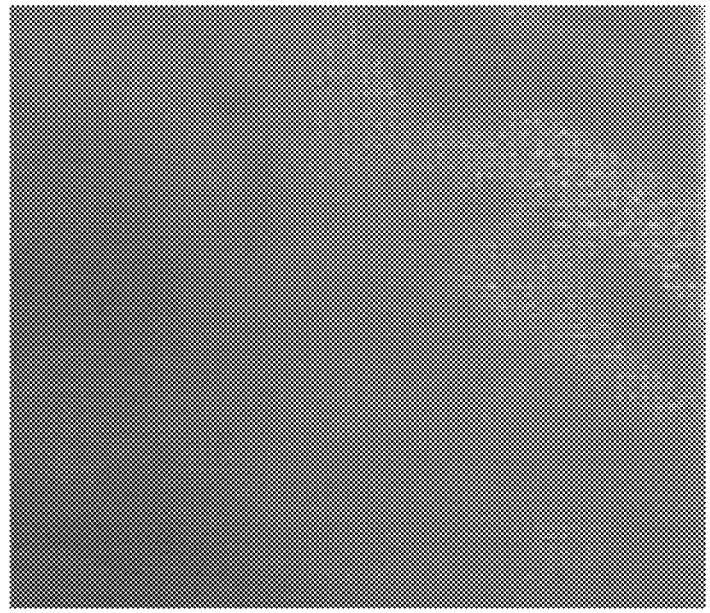
FIG. 1 shows the appearance of a laminate with dry board.

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, "or a combination thereof" means "or any combination thereof", and "any" means "any one", vice versa.

As used herein, the term "comprises," "comprising," "includes," "including," "encompass," "encompassing," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "encompassing," "has," "having" or any other variant thereof, it is understood that close-ended transitional phrases such as "consisting of," "composed by" and "remainder being" and partially open-ended transitional phrases such as "consisting essentially of," "primarily consisting of," "mainly consisting of," "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$, and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure shall be interpreted as any combination of X is $X_1$ or $X_2$ or $X_3$ and Y is $Y_1$ or $Y_2$ or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. A prepolymer refers to a chemical substance formed by two or more compounds via a polymerization reaction with a conversion rate of 10% to 90%. The term "polymer" includes but is not limited to an oligomer. An oligomer refers to a polymer with 2-20, typically 2-5, repeating units. For example, the term "diene polymer" as used herein is construed as comprising diene homopolymer, diene copolymer, diene prepolymer and diene oligomer.

Unless otherwise specified, according to the present disclosure, a copolymer refers to the product formed by two or more monomers via polymerization, including but not limited to random copolymers, alternating copolymers, graft copolymers or block copolymers. For example, a styrene-butadiene copolymer refers to the product formed only by styrene and butadiene monomers; a styrene-butadiene copolymer comprises, such as but not limited to, a styrene-butadiene random copolymer, a styrene-butadiene alternating copolymer, a styrene-butadiene graft copolymer or a styrene-butadiene block copolymer. A styrene-butadiene block copolymer comprises, such as but not limited to, a polymerized molecular structure of styrene-styrene-styrene-butadiene-butadiene-butadiene-butadiene. A styrene-butadiene block copolymer comprises, such as but not limited to, a styrene-butadiene-styrene block copolymer. A styrene-butadiene-styrene block copolymer comprises, such as but not limited to, a polymerized molecular structure of styrene-styrene-styrene-butadiene-butadiene-butadiene-butadiene-styrene-styrene-styrene. Similarly, a hydrogenated styrene-butadiene copolymer comprises a hydrogenated styrene-butadiene random copolymer, a hydrogenated styrene-butadiene alternating copolymer, a hydrogenated styrene-butadiene graft copolymer or a hydrogenated styrene-butadiene block copolymer. A hydrogenated styrene-butadiene block copolymer comprises, such as but not limited to, a hydrogenated styrene-butadiene-styrene block copolymer.

Unless otherwise specified, the term "resin" is a widely used common name of a synthetic polymer and is construed in the present disclosure as comprising monomer and its combination, polymer and its combination or a combination of monomer and its polymer, but not limited thereto. For example, in the present disclosure, the term "maleimide resin" is construed to encompass a maleimide monomer, a maleimide polymer, a combination of maleimide monomers, a combination of maleimide polymers, or a combination of maleimide monomer(s) and maleimide polymer(s).

For example, in the present disclosure, the term "vinyl-containing" is construed to encompass the inclusion of a vinyl group, a vinylene group, an allyl group, a (meth)acrylate group or a combination thereof.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from homopolymerizing a resin, a product derived from copolymerizing a resin and other resins, etc. For example, such as but not limited thereto, a modification may refer to replacing a hydroxyl group with a vinyl group via a chemical reaction, or obtaining a terminal hydroxyl group from a chemical reaction of a terminal vinyl group and p-aminophenol.

The unsaturated bond described herein, unless otherwise specified, refers to a reactive unsaturated bond, such as but not limited to an unsaturated double bond with the potential of being crosslinked with other functional groups, such as an unsaturated C=C double bond with the potential of being crosslinked with other functional groups, but not limited thereto.

Unless otherwise specified, according to the present disclosure, when the term acrylate compound is expressed as (meth)acrylate, it is intended to comprise both situations of containing and not containing a methyl group; for example, cyclohexane dimethanol di(meth)acrylate is construed as including cyclohexane dimethanol diacrylate, cyclohexane dimethanol dimethacrylate or both.

Unless otherwise specified, an alkyl group described herein is construed to encompass various isomers thereof. For example, a propyl group is construed to encompass n-propyl and i-propyl.

It should be understood that all features disclosed herein may be combined in any way to constitute the solution of the present disclosure, as long as there is no conflict present in the combination of these features.

Unless otherwise specified, as used herein, part(s) by weight represents weight part(s) in any weight unit, such as but not limited to kilogram, gram, pound and so on. For example, 100 parts by weight of the maleimide resin may represent 100 kilograms of the maleimide resin or 100 pounds of the maleimide resin.

The following embodiments and examples are illustrative in nature and are not intended to limit the present disclosure and its application. In addition, the present disclosure is not bound by any theory described in the background and summary above or the following embodiments or examples. Unless otherwise specified, processes, reagents and conditions described in the examples are those known in the art.

Generally, the present disclosure provides a resin composition, comprising:
(A) 100 parts by weight of an unsaturated C=C double bond-containing polyphenylene ether resin;
(B) 15 parts by weight to 40 parts by weight of a hydrogenated styrene-butadiene-styrene triblock copolymer;
(C) 1 part by weight to 20 parts by weight of a compound of Formula (1); and
(D) 0.001 part by weight to 0.5 part by weight of a compound of Formula (2), a compound of Formula (3), a compound of Formula (4) or a combination thereof;

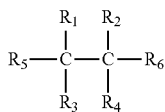

Formula (1)

wherein $R_1$ to $R_4$ are independently a hydrogen atom, a C1-C3 alkyl group (e.g., methyl, ethyl, n-propyl, or isopropyl), a phenyl group or a C1-C3 alkyl group-substituted phenyl group; and $R_5$ and $R_6$ are independently a phenyl group or a C1-C3 alkyl group-substituted phenyl group;

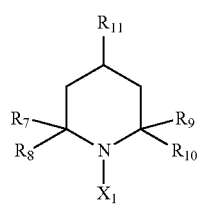

Formula (2)

wherein $X_1$ is an oxygen radical or a hydroxyl group; $R_7$ to $R_{10}$ are independently a hydrogen atom or a C1-C5 alkyl group (e.g., methyl, ethyl, propyl, butyl, pentyl or an isomer thereof), and $R_7$ to $R_{10}$ are not a hydrogen atom at the same time, and $R_{11}$ is a hydrogen atom, a methyl group, an amino group, a hydroxyl group, a carbonyl group or a carboxyl group;

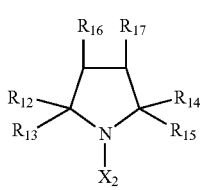

Formula (3)

wherein $X_2$ is an oxygen radical or a hydroxyl group; $R_{12}$ to $R_{18}$ are independently a hydrogen atom or a C1-C5 alkyl group, and $R_{12}$ to $R_{15}$ are not a hydrogen atom at the same time; and $R_{16}$ and $R_{17}$ are independently a hydrogen atom, a methyl group, an amino group, a hydroxyl group, a carbonyl group or a carboxyl group, or $R_{16}$ and $R_{17}$ together define a benzene ring structure:

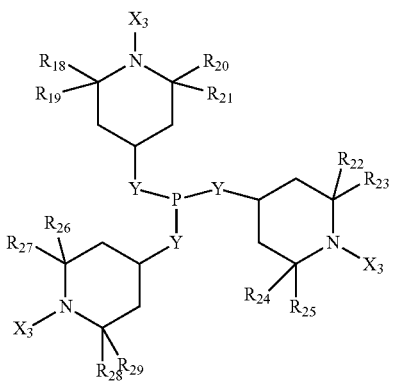

Formula (4)

wherein $X_3$ each independently is an oxygen radical or a hydroxyl group; Y is an oxygen atom or a phenylene group (—$C_6H_4$—); and $R_{18}$ to $R_{29}$ are independently a hydrogen atom or a $C_1$-$C_5$ alkyl group, and $R_{18}$ to $R_{29}$ are not a hydrogen atom at the same time.

For example, in one embodiment, unless otherwise specified, the unsaturated C=C double bond-containing polyphenylene ether resin described in various embodiments may comprise various polyphenylene ether resins with terminals modified by a vinyl group, an allyl group, or a (meth)acrylate group, such as a vinylbenzyl-containing biphenyl polyphenylene ether resin, a methacrylate-containing polyphenylene ether resin, a vinylbenzyl-containing bisphenol A polyphenylene ether resin, a chain-extended vinyl-containing polyphenylene ether resin or a combination thereof, but not limited thereto.

For example, in one embodiment, the unsaturated C=C double bond-containing polyphenylene ether resin may comprise various unsaturated C=C double bond-containing polyphenylene ether resins known in the art to which this disclosure pertains. The unsaturated C=C double bond-containing polyphenylene ether resin suitable for the present disclosure is not particularly limited and may comprise any one or more commercially available products, self-prepared products, or a combination thereof. In some embodiments, examples of the unsaturated C=C double bond-containing polyphenylene ether resin include: vinylbenzyl-containing biphenyl polyphenylene ether resin (e.g., OPE-2st available from Mitsubishi Gas Chemical Co., Inc.), methacrylate-containing polyphenylene ether resin (e.g., SA9000 available from Sabic), vinylbenzyl-containing bisphenol A polyphenylene ether resin, chain-extended vinyl-containing polyphenylene ether resin or a combination thereof. The chain-extended vinyl-containing polyphenylene ether resin may include various polyphenylene ether resins disclosed in the US Patent Application Publication No. 2016/0185904 A1, all of which are incorporated herein by reference in their entirety.

For example, in one embodiment, the hydrogenated styrene-butadiene-styrene triblock copolymer may comprise any hydrogenated styrene-butadiene-styrene triblock copolymers, also known as styrene ethylene/butylene styrene copolymers, in the art to which this disclosure pertains. The hydrogenated styrene-butadiene-styrene triblock copolymer suitable for the present disclosure is not particularly limited and may comprise any one or more commercially available products, self-prepared products or a combination thereof. For example, in one embodiment, the hydrogenated styrene-butadiene-styrene triblock copolymer comprises an unsubstituted hydrogenated styrene-butadiene-styrene triblock copolymer, a maleic anhydride-substituted hydrogenated styrene-butadiene-styrene triblock copolymer or a combination thereof. For example, in one embodiment, the hydrogenated styrene-butadiene-styrene triblock copolymer may comprise commercially available hydrogenated styrene-butadiene-styrene triblock copolymers such as H1221, H1062, H1521, H1052, H1041, H1053, H1051, H1517, H1043, N504, H1272, M1943, M1911 or M1913 produced by Asahi KASEI, or G1650, G1651, G1652, G1654, G1657, G1726, FG1901 or FG1924 produced by KRATON, or 8004, 8006 or 8007L produced by Kuraray. Unless otherwise specified, relative to 100 parts by weight of the unsaturated C=C double bond-containing polyphenylene ether resin, the hydrogenated styrene-butadiene-styrene triblock copolymer may range from 15 parts by weight to 40 parts by weight, such as but not limited to 15 parts by weight, 20 parts by weight, 25 parts by weight, 30 parts by weight, 35 parts by weight or 40 parts by weight.

Relative to 100 parts by weight of the unsaturated C=C double bond-containing polyphenylene ether resin, the compound of Formula (1) may range from 1 part by weight to 20 parts by weight, such as but not limited to 1 part by weight, 2 parts by weight, 5 parts by weight, 8 parts by weight, 10 parts by weight, 12 parts by weight or 20 parts by weight.

For example, in one embodiment, the compound of Formula (1) may comprise, but not limited to, a compound of Formula (1-1), a compound of Formula (1-2), a compound of Formula (1-3) or a combination thereof:

Formula (1-1)

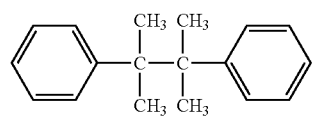

Formula (1-2)

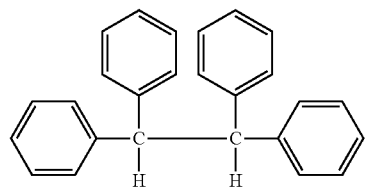

Formula (1-3)

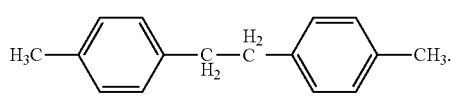

Relative to 100 parts by weight of the unsaturated C=C double bond-containing polyphenylene ether resin, the amount of the compound of Formula (2), the compound of Formula (3), the compound of Formula (4) or a combination thereof may range from 0.001 part by weight to 0.5 part by weight, such as but not limited to 0.001 part by weight, 0.002 part by weight, 0.003 part by weight, 0.005 part by weight, 0.006 part by weight, 0.01 part by weight, 0.05 part by weight, 0.1 part by weight, 0.2 part by weight or 0.5 part by weight.

For example, in one embodiment, the compound of Formula (2) may comprise, but not limited to, a compound of Formula (2-1), a compound of Formula (2-2), a compound of Formula (2-3), a compound of Formula (24), a compound of Formula (2-5) or a combination thereof:

Formula (2-1)

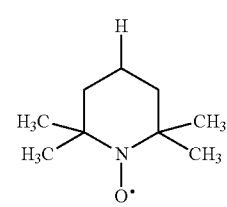

Formula (2-2)

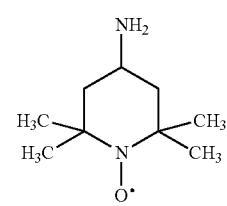

Formula (2-3)

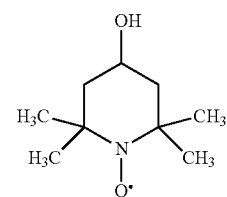

Formula (2-4)

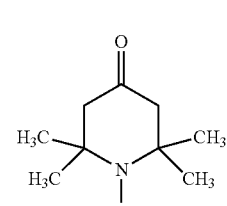

Formula (2-5)

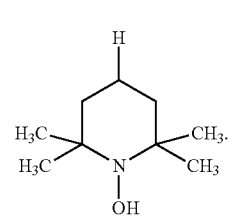

In the resin composition of the present disclosure, the compound of Formula (2) preferably comprises a compound of any one of Formula (2-1) to Formula (2-5) or a combination thereof, but not limited thereto. Unless otherwise specified, in the compound of Formula (2), the oxygen radical at the position $X_1$ and the hydroxyl group at the position $X_1$ are chemically equivalent. For example, the structure of Formula (2-1) and the structure of Formula (2-5) are equivalent to each other; that is, the structure of Formula (2-1) may be present as the structure of Formula (2-5), and the structure of Formula (2-5) may be present as the structure of Formula (2-1).

For example, in one embodiment, the compound of Formula (3) may comprise, but not limited to, a compound of Formula (3-1), a compound of Formula (3-2), a compound of Formula (3-3), a compound of Formula (3-4) or a combination thereof:

Formula (3-1)
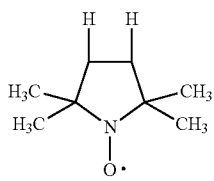

Formula (3-2)
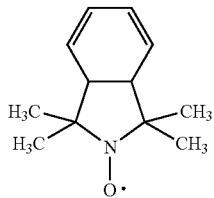

Formula (3-3)
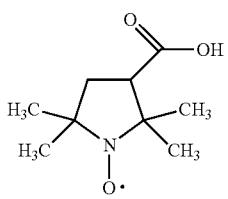

Formula (3-4)
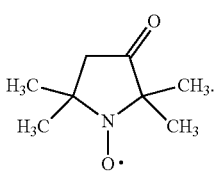

In the resin composition of the present disclosure, the compound of Formula (3) preferably comprises a compound of any one of Formula (3-1) to Formula (3-4) or a combination thereof, but not limited thereto. Unless otherwise specified, in the compound of Formula (3), the oxygen radical at the position $X_2$ and the hydroxyl group at the position $X_2$ are chemically equivalent.

For example, in one embodiment, the compound of Formula (4) may comprise, but not limited to, a compound of Formula (4-1), a compound of Formula (4-2), a compound of Formula (4-3) or a combination thereof:

Formula (4-1)
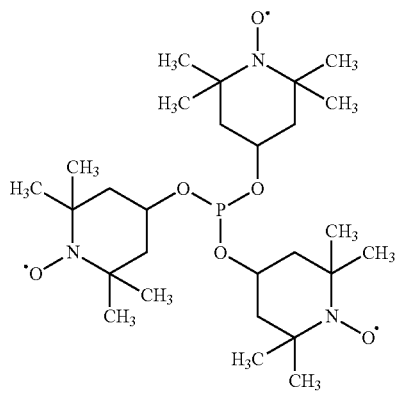

Formula (4-2)
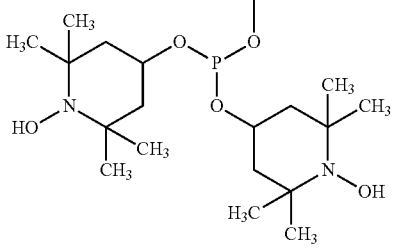

Formula (4-3)
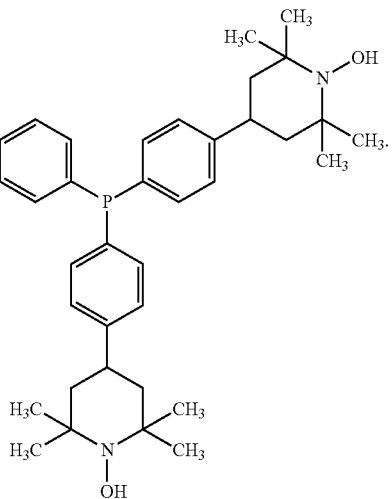

In the resin composition of the present disclosure, the compound of Formula (4) preferably comprises a compound of any one of Formula (4-1) to Formula (4-3) or a combination thereof, but not limited thereto. Unless otherwise specified, in the compound of Formula (4), the oxygen radical at the position $X_3$ and the hydroxyl group at the position $X_3$ are chemically equivalent.

In addition to the aforesaid components, for example, in one embodiment, the resin composition may optionally further comprise triallyl isocyanurate. The amount of triallyl isocyanurate is not particularly limited. For example, in one embodiment, relative to 100 parts by weight of the unsaturated C=C double bond-containing polyphenylene ether resin, the amount of triallyl isocyanurate may be for example 1 part by weight to 30 parts by weight, preferably 5 parts by weight to 25 parts by weight, but not limited thereto.

In addition to the aforesaid components, for example, in one embodiment, the resin composition may optionally further comprise various crosslinking agents, such as but not limited to maleimide resin, divinylbenzene, divinylbenzyl ether, divinylnaphthalene, divinylbiphenyl, styrene, polyester or a combination thereof. For example, in one embodiment, relative to 100 parts by weight of the unsaturated C=C double bond-containing polyphenylene ether resin, the amount of crosslinking agent may be for example 1 part by weight to 50 parts by weight, preferably 5 parts by weight to 30 parts by weight, but not limited thereto.

In addition to the aforesaid components, for example, in one embodiment, the resin composition may optionally further comprise inorganic filler, curing accelerator, solvent, flame retardant, silane coupling agent, coloring agent, toughening agent, core-shell rubber or a combination thereof.

For example, in one embodiment, the inorganic filler suitable for the present disclosure may be any one or more inorganic fillers suitable for preparing a prepreg, a resin film, a laminate or a printed circuit board, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate-modified talc, zinc oxide, zirconium oxide, mica, boehmite (AlOOH), calcined talc, talc, silicon nitride, or calcined kaolin. Moreover, the inorganic filler can be spherical, fibrous, plate-like, particulate, flake-like or whisker-like in shape and can be optionally pretreated by a silane coupling agent.

Unless otherwise specified, relative to 100 parts by weight of the unsaturated C=C double bond-containing polyphenylene ether resin, in the resin composition disclosed herein, the amount of the inorganic filler described above is not particularly limited and may range from 10 parts by weight to 300 parts by weight, for example. Preferably, the amount of the inorganic filler described above may range from 80 parts by weight to 270 parts by weight. More preferably, the amount of the inorganic filler described above may range from 240 parts by weight to 270 parts by weight.

Unless otherwise specified, the curing accelerator used in the present disclosure is not particularly limited and may include any one or more curing accelerators useful for making a prepreg, a resin film, a laminate or a printed circuit board. In one embodiment, for example, the curing accelerator suitable for the present disclosure may comprise a catalyst, such as a Lewis base or a Lewis acid. The Lewis base may comprise imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP) or a combination thereof. The Lewis acid may comprise metal salt compounds, such as those of manganese, iron, cobalt, nickel, copper and zinc, such as zinc octanoate or cobalt octanoate. The curing accelerator encompasses curing initiator such as a peroxide capable of producing free radicals, and examples of the curing initiator may comprise, but not limited to: dibenzoyl peroxide (BPO), dicumyl peroxide, 2,5-dimethyl-2,5-di(t-butylperoxy)hexane, 2,5-dimethyl-2,5-di(t-butylperoxy)-3-hexyne (25B), di-t-butyl peroxide, di(t-butylperoxyisopropyl)benzene, di(t-butylperoxy)phthalate, di(t-butylperoxy)isophthalate, t-butyl peroxybenzoate, 2,2-di(t-butylperoxy)butane, 2,2-di(t-butylperoxy)octane, 2,5-dimethyl-2,5-di(benzoylperoxy)hexane, lauroyl peroxide, t-hexyl peroxypivalate, dibutylperoxyisopropylbenzene, bis (4-t-butylcyclohexyl) peroxydicarbonate or a combination thereof. The amount of the curing accelerator used herein may be adjusted according to the need. For example, relative to 100 parts by weight of the unsaturated C=C double bond-containing polyphenylene ether resin, in the resin composition disclosed herein, the amount of curing accelerator described above is not particularly limited and may range from 0.1 part by weight to 15 parts by weight, such as 0.1 part by weight to 0.5 part by weight or 1 part by weight to 10 parts by weight.

The purpose of adding solvent according to the present disclosure is to dissolve the components in the resin composition so as to change the solid content of the resin composition and to adjust the viscosity of the resin composition. For example, the solvent may comprise, but not limited to, methanol, ethanol, ethylene glycol monomethyl ether, acetone, butanone (i.e., methyl ethyl ketone), methyl isobutyl ketone, cyclohexanone, toluene, xylene, methoxyethyl acetate, ethoxyethyl acetate, propoxyethyl acetate, ethyl acetate, propylene glycol methyl ether, dimethyl formamide, dimethyl acetamide, N-methyl-pyrrolidone, or a mixture thereof. The amount of solvent is not particularly limited and may be adjusted according to the viscosity required for the resin composition.

For example, in one embodiment, in the resin composition disclosed herein, exclusive of inorganic filler and solvent, the amount of flame retardant, curing accelerator, silane coupling agent, coloring agent, toughening agent or core-shell rubber may be 0.01 part by weight to 100 parts by weight, such as but not limited to 0.01 part by weight to 3 parts by weight, 30 parts by weight to 80 parts by weight or 50 parts by weight to 100 parts by weight.

Unless otherwise specified, the flame retardant suitable for the present disclosure may be any one or more flame retardants suitable for preparing a prepreg, a resin film, a laminate or a printed circuit board; examples include but are not limited to phosphorus-containing flame retardants, preferably including ammonium polyphosphate, hydroquinone bis(diphenyl phosphate), bisphenol A bis(diphenylphosphate), tri(2-carboxyethyl)phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, 9,10-dihydro-9-oxa-10-phosphaphenanthrene-10-oxide (DOPO) and its derivatives (such as a di-DOPO compound) or resins, diphenylphosphine oxide (DPPO) and its derivatives (such as a di-DPPO compound) or resins, melamine cyanurate, tri-hydroxyethyl isocyanurate, aluminium phosphinate (e.g., commercially available OP-930 and OP-935), or a combination thereof. Unless otherwise specified, the amount of the aforesaid flame retardant is not particularly limited.

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, wherein DOPO-PN is a DOPO-containing phenol novolac resin, and DOPO-BPN may be a DOPO-containing bisphenol novolac resin, such as DOPO-BPAN (DOPO-bisphenol A novolac), DOPO-BPFN (DOPO-bisphenol F novolac) and DOPO-BPSN (DOPO-bisphenol S novolac). Unless otherwise specified, the amount of the aforesaid flame retardant is not particularly limited.

Unless otherwise specified, silane coupling agent suitable for the present disclosure may comprise silane (such as but not limited to siloxane), which may be further categorized according to the functional groups into amino silane, epoxide silane, vinyl silane, ester silane, hydroxyl silane, isocyanate silane, methacryloxy silane and acryloxy silane. The amount of silane coupling agent is not particularly limited and may be adjusted according to the dispersivity of inorganic filler used in the resin composition.

Unless otherwise specified, the coloring agent suitable for the present disclosure may comprise, but not limited to, dye or pigment.

The purpose of toughening agent used herein is to improve the toughness of the resin composition. Unless otherwise specified, the toughening agent suitable for the present disclosure may comprise, but not limited to, carboxyl-terminated butadiene acrylonitrile rubber (CTBN rubber).

The resin compositions of various embodiments of the present disclosure may be processed by various methods into different articles, including but not limited to a prepreg, a resin film, a laminate or a printed circuit board.

For example, the resin compositions of various embodiments may be used to make prepregs.

For example, in one embodiment, the prepreg disclosed herein has a reinforcement material and a layered structure formed thereon, wherein the layered structure is made by heating the resin composition at high temperature to a semi-cured state (B-stage). Suitable baking temperature for making the prepreg may be for example 140° C. to 180° C. The reinforcement material may be a fiber material or a non-fiber material, configured as any one of woven fabric and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

For example, in one embodiment, by well mixing the resin composition to form a varnish, loading the varnish into an impregnation tank, impregnating a fiberglass fabric into the impregnation tank to adhere the resin composition onto the fiberglass fabric, and finally heating and baking the resin composition at a proper temperature to a semi-cured state, a prepreg may be obtained.

For example, the article made from the resin composition disclosed herein may be a resin film.

For example, in one embodiment, the resin film disclosed herein is prepared by heating and baking the resin composition to the semi-cured state. For example, by selectively coating the resin composition on a liquid crystal polymer film, a polyethylene terephthalate film (PET film) or a polyimide film, followed by heating and baking at a proper temperature to a semi-cured state, a resin film may be obtained. For example, the resin composition from each embodiment may be coated on a copper foil to uniformly adhere the resin composition thereon, followed by heating and baking at a proper temperature to a semi-cured state to obtain the resin film.

For example, the resin compositions of various embodiments may be used to make laminates.

For example, in one embodiment, the laminate of the present disclosure comprises at least two metal foils and at least one insulation layer disposed between the metal foils, wherein the insulation layer may be made by curing the resin composition at high temperature and high pressure to the C-stage, a suitable curing temperature being for example between 200° C. and 255° C. and preferably between 220° C. and 255° C., a suitable curing time being 90 to 240 minutes and preferably 120 to 210 minutes, and a suitable pressure being for example between 400 and 800 psi and preferably between 500 and 650 psi. The insulation layer may be obtained by curing the aforesaid prepreg or resin film. The metal foil may contain copper, aluminum, nickel, platinum, silver, gold or alloy thereof, such as a copper foil. In a preferred embodiment, the laminate is a copper-clad laminate.

For example, in one embodiment, the laminate may be further processed by trace formation processes to provide a printed circuit board.

In one embodiment of making a printed circuit board, a double-sided copper-clad laminate (such as product EM-891, available from Elite Material Co., Ltd.) with a thickness of 28 mil and having 0.5 ounce (oz) HVLP (hyper very low profile) copper foils may be used, which is subject to drilling and then electroplating, so as to form electrical conduction between the top layer copper foil and the bottom layer copper foil. Then the top layer copper foil and the bottom layer copper foil are etched to form inner layer circuits. Then brown oxidation and roughening are performed on the inner layer circuits to form uneven structures on the surface to increase roughness. Next, a vacuum lamination apparatus is used to laminate the assembly of a copper foil, the prepreg, the inner layer circuit, the prepreg and a copper foil stacked in said order by heating at 190° C. to 245° C. for 90 to 240 minutes to cure the insulation material of the prepregs. Next, black oxidation, drilling, copper plating and other known circuit board processes are performed on the outmost copper foils so as to obtain the printed circuit board.

In one embodiment, the resin composition disclosed herein may achieve improvement in one or more of the following properties of the article made therefrom: glass transition temperature, difference rate of dissipation factor caused by thermal aging, difference rate of dissipation factor caused by moisture and heat, and appearance of article.

For example, articles made from the resin compositions according to the present disclosure may achieve one, more or all of the following properties:

a glass transition temperature as measured by reference to IPC-TM-650 2.4.24.4 of greater than or equal to 180° C.:

a difference rate of dissipation factor (i.e., difference rate of dissipation factor caused by thermal aging) of less than or equal to 90% calculated according to a dissipation factor as measured by reference to JIS C2565 at 10 GHz after being subject to standing still at 188° C. for 48 hours:

a difference rate of dissipation factor (i.e., difference rate of dissipation factor caused by moisture and heat) of less than or equal to 30% calculated according to a dissipation factor as measured by reference to JIS C2565 at 10 GHz after being subject to standing still at 85° C. and a relative humidity of 85% for 48 hours, and article such as laminate without dry board as observed by naked eyes and without thickness unevenness.

Raw materials below were used to prepare the resin compositions of various Examples and Comparative Examples of the present disclosure according to the amount listed in Table 1 to Table 4 and further fabricated to prepare test samples.

Materials and reagents used in Examples and Comparative Examples disclosed herein are listed below:

SA9000: methacrylate-containing polyphenylene ether resin, available from Sabic.

OPE-2st 1200: vinylbenzyl-containing biphenyl polyphenylene ether resin, available from Mitsubishi Gas Chemical Co., Inc.

OPE-2st 2200: vinylbenzyl-containing biphenyl polyphenylene ether resin, available from Mitsubishi Gas Chemical Co., Inc.

G1726: hydrogenated styrene-butadiene-styrene triblock copolymer, available from KRATON.

FG1901: maleic anhydride-substituted hydrogenated styrene-butadiene-styrene triblock copolymer, available from KRATON.

B-3000: polybutadiene, available from Nippon Soda Co., Ltd.

TAIC: triallyl isocyanurate, commercially available.

Compounds of Formula (1-1) to Formula (1-3): available from Wuxi Zhufeng Fine Chemical Co., Ltd.

DCP: dicumyl peroxide, commercially available. 25B: 2,5-dimethyl-2,5-di(t-butylperoxy)-3-hexyne, available from NOF Corporation.

2E4MZ: 2-ethyl-4-methylimidazole, available from Kingyorker Enterprise Co., Ltd.

Compounds of Formula (2-1) to Formula (2-2): available from Union Chemical Ind. Co., Ltd.

Compounds of Formula (3-1) to Formula (3-2): available from Union Chemical Ind. Co., Ltd.

Compound of Formula (4-1): available from Union Chemical Ind. Co., Ltd.

1,4-naphthoquinone: available from Merck.

4-t-butylcatechol: commercially available.

SC2500-SVJ: spherical silica, available from Admatechs.

Toluene: commercially available. The amount of toluene is shown as "PA" in the Tables to indicate a "proper amount" to represent an amount of toluene used to achieve a 64% solid content of the whole resin composition.

Compositions and test results of resin compositions of Examples and Comparative Examples are listed below (in part by weight):

TABLE 1

Resin compositions of Examples (in part by weight) and test results

| Composition | | E1 | E2 | E3 | E4 | E5 | E6 | E7 | E8 |
|---|---|---|---|---|---|---|---|---|---|
| unsaturated C=C double bond-containing polyphenylene ether resin | SA9000 | 100 | 100 | 100 | 100 | 100 | 100 | 100 | 100 |
| | OPE-2st 1200 | | | | | | | | |
| | OPE-2st 2200 | | | | | | | | |
| hydrogenated styrene-butadiene-styrene triblock copolymer | G1726 | 40 | 40 | 40 | 40 | 40 | 40 | 40 | 40 |
| | FG1901 | | | | | | | | |
| polybutadiene | B-3000 | | | | | | | | |
| triallyl isocyanurate | TAIC | | | | | | | | |
| compound of Formula (1) | (1-1) | 1 | 10 | 20 | 10 | 10 | | | 10 |
| | (1-2) | | | | | | 10 | | |
| | (1-3) | | | | | | | 10 | |
| initiator | DCP | | | | | | | | |
| | 25B | | | | | | | | |
| | 2E4MZ | | | | | | | | |
| compound of Formula (2) | (2-1) | 0.005 | 0.005 | 0.005 | 0.001 | 0.500 | 0.005 | 0.005 | |
| | (2-2) | | | | | | | | 0.005 |
| compound of Formula (3) | (3-1) | | | | | | | | |
| | (3-2) | | | | | | | | |
| compound of Formula (4) | (4-1) | | | | | | | | |
| 1,4-naphthoquinone | | | | | | | | | |
| 4-t-butylcatechol | | | | | | | | | |
| inorganic filler | SC2500-SVJ | 150 | 150 | 150 | 150 | 150 | 150 | 150 | 150 |
| solvent (S/C = 64%) | toluene | PA | PA | PA | PA | PA | PA | PA | PA |
| Property | Unit | E1 | E2 | E3 | E4 | E5 | E6 | E7 | E8 |
| glass transition temperature | °C. | 181 | 183 | 186 | 183 | 181 | 185 | 181 | 182 |
| difference rate of dissipation factor caused by thermal aging | % | 86 | 83 | 80 | 84 | 85 | 86 | 84 | 83 |
| difference rate of dissipation factor caused by moisture and heat | % | 29 | 27 | 24 | 26 | 28 | 29 | 28 | 27 |
| article appearance | / | OK | OK | OK | OK | OK | OK | OK | OK |

TABLE 2

Resin compositions of Examples (in part by weight) and test results

| Composition | | E9 | E10 | E11 | E12 | E13 | E14 | E15 | E16 |
|---|---|---|---|---|---|---|---|---|---|
| unsaturated C=C double bond-containing polyphenylene ether resin | SA9000 | 100 | 100 | 100 | 100 | 100 | 100 | 100 | 70 |
| | OPE-2st 1200 | | | | | | | | 15 |
| | OPE-2st 2200 | | | | | | | | 15 |
| hydrogenated styrene-butadiene-styrene triblock copolymer | G1726 | 40 | 40 | 40 | 40 | 40 | 40 | 15 | 30 |
| | FG1901 | | | | | | | | 5 |
| polybutadiene | B-3000 | | | | | | | | |
| triallyl isocyanurate | TAIC | | | | 25 | 5 | | | 15 |
| compound of Formula (1) | (1-1) | 10 | 10 | 10 | 10 | 10 | 8 | 10 | 5 |
| | (1-2) | | | | | | | | 4 |
| | (1-3) | | | | | | | | 3 |
| initiator | DCP | | | | | | 2 | | |
| | 25B | | | | | | | | |
| | 2E4MZ | | | | | | | | |
| compound of formula (2) | (2-1) | | | | | | 0.005 | 0.005 | 0.002 |
| | (2-2) | | | | | | | | |
| compound of Formula (3) | (3-1) | 0.005 | | | | | | | 0.001 |
| | (3-2) | | 0.005 | | | | | | |
| compound of Formula (4) | (4-1) | | | 0.005 | 0.005 | 0.005 | | | 0.003 |
| 1,4-naphthoquinone | | | | | | | | | |
| 4-t-butylcatechol | | | | | | | | | |
| inorganic filler | SC2500-SVJ | 150 | 150 | 150 | 150 | 150 | 150 | 150 | 185 |
| solvent (S/C = 64%) | toluene | PA | PA | PA | PA | PA | PA | PA | PA |
| Property | Unit | E9 | E10 | E11 | E12 | E13 | E14 | E15 | E16 |
| glass transition temperature | ° C. | 183 | 184 | 186 | 235 | 210 | 187 | 185 | 220 |
| difference rate of dissipation factor caused by thermal aging | % | 84 | 86 | 86 | 70 | 72 | 80 | 90 | 71 |
| difference rate of dissipation factor caused by moisture and heat | % | 28 | 29 | 29 | 21 | 23 | 26 | 28 | 22 |
| article appearance | / | OK | OK | OK | OK | OK | OK | OK | OK |

TABLE 3

Resin compositions of Comparative Examples (in part by weight) and test results

| Composition | | C1 | C2 | C3 | C4 | C5 | C6 |
|---|---|---|---|---|---|---|---|
| unsaturated C=C double bond-containing polyphenylene ether resin | SA9000 | 100 | 100 | 100 | 100 | 100 | 100 |
| | OPE-2st 1200 | | | | | | |
| | OPE-2st 2200 | | | | | | |
| hydrogenated styrene-butadiene-styrene triblock copolymer | G1726 | 40 | 40 | 40 | 40 | 40 | 40 |
| | FG1901 | | | | | | |
| polybutadiene | B-3000 | | | | | | |
| triallyl isocyanurate | TAIC | | | | | | |
| compound of Formula (1) | (1-1) | | 30 | | | | 8 |
| | (1-2) | | | | | | |
| | (1-3) | | | | | | |
| initiator | DCP | | | | 10 | | 2 |
| | 25B | | | | | 10 | |
| | 2E4MZ | | | | | | 10 |
| compound of Formula (2) | (2-1) | 0.005 | 0.005 | 0.005 | 0.005 | 0.005 | |
| | (2-2) | | | | | | |
| compound of Formula (3) | (3-1) | | | | | | |
| | (3-2) | | | | | | |
| compound of Formula (4) | (4-1) | | | | | | |
| 1,4-naphthoquinone | | | | | | | |
| 4-t-butylcatechol | | | | | | | |
| inorganic filler | SC2500-SVJ | 150 | 150 | 150 | 150 | 150 | 150 |
| solvent (S/C = 64%) | toluene | PA | PA | PA | PA | PA | PA |
| Property | Unit | C1 | C2 | C3 | C4 | C5 | C6 |
| glass transition temperature | ° C. | 141 | 179 | 155 | 156 | 136 | 178 |
| difference rate of dissipation factor caused by thermal aging | % | 115 | 120 | 125 | 119 | 142 | 98 |
| difference rate of dissipation factor caused by moisture and heat | % | 45 | 48 | 53 | 48 | 50 | 38 |
| article appearance | / | OK | OK | OK | OK | OK | dry board |

TABLE 4

Resin compositions of Comparative Examples (in part by weight) and test results

| Composition | | C7 | C8 | C9 | C10 | C11 |
|---|---|---|---|---|---|---|
| unsaturated C=C double bond-containing polyphenylene ether resin | SA9000 | 100 | 100 | 100 | 100 | 100 |
| | OPE-2st 1200 | | | | | |
| | OPE-2st 2200 | | | | | |
| hydrogenated styrene-butadiene-styrene triblock copolymer | G1726 | 40 | 40 | 40 | 40 | |
| | FG1901 | | | | | |
| polybutadiene | B-3000 | | | | | 40 |
| triallyl isocyanurate | TAIC | | | | | |
| compound of Formula (1) | (1-1) | 10 | 10 | 10 | 10 | 10 |
| | (1-2) | | | | | |
| | (1-3) | | | | | |
| initiator | DCP | | | | | |
| | 25B | | | | | |
| | 2E4MZ | | | | | |
| compound of Formula (2) | (2-1) | | 0.900 | | | 0.005 |
| | (2-2) | | | | | |
| compound of Formula (3) | (3-1) | | | | | |
| | (3-2) | | | | | |
| compound of Formula (4) | (4-1) | | | | | |
| 1,4-naphthoquinone | | | | 0.005 | | |
| 4-t-butylcatechol | | | | | 0.005 | |
| inorganic filler | SC2500-SVJ | 150 | 150 | 150 | 150 | 150 |
| solvent (S/C = 64%) | toluene | PA | PA | PA | PA | PA |
| Property | Unit | C7 | C8 | C9 | C10 | C11 |
| glass transition temperature | °C. | 175 | 174 | 170 | 173 | 168 |
| difference rate of dissipation factor caused by thermal aging | % | 94 | 96 | 95 | 97 | 116 |
| difference rate of dissipation factor caused by moisture and heat | % | 34 | 35 | 35 | 36 | 49 |
| article appearance | / | dry board | uneven thickness | OK | OK | OK |

Samples (specimens) for the properties measured above were prepared as described below and tested and analyzed under specified conditions below.

1. Prepreg: Resin composition from each Example (listed in Table 1 and Table 2) or each Comparative Example (listed in Table 3 and Table 4) was respectively well-mixed to form a varnish, in which the dissolvable solid state chemical reagents were all dissolved. Then the varnish was loaded to an impregnation tank, and a fiberglass fabric (e.g., 1078 L-glass fiber fabric available from Asahi or 2116 E-glass fiber fabric available from Asahi) was impregnated into the impregnation tank to adhere the resin composition onto the fiberglass fabric, followed by heating at 130° C. to 170° C. to the semi-cured state (B-stage) to obtain a prepreg. Prepregs made from the 1078 glass fiber fabrics have a resin content of about 79%, and prepregs made from the 2116 glass fiber fabrics have a resin content of about 55%.

2. Copper-containing laminate 1 (a.k.a. copper-clad laminate 1, formed by lamination of two prepregs): Two 18 μm HVLP (hyper very low profile) copper foils and two prepregs obtained from 1078 L-glass fiber fabrics impregnated with each Example or each Comparative Example and having a resin content of about 79% were prepared and stacked in the order of one copper foil, two prepregs and one copper foil, followed by lamination under vacuum with a lamination pressure of 600 psi at 235° C. for 150 minutes, wherein the peak temperature of lamination is 245° C., to form the copper-containing laminate 1. Insulation layers were formed by laminating two sheets of prepreg between the two copper foils, and the resin content of the insulation layers is about 79%.

3. Copper-containing laminate 2 (a.k.a. copper-clad laminate 2, formed by lamination of six prepregs): Two 18 μm HVLP (hyper very low profile) copper foils and six prepregs obtained from 2116 E-glass fiber fabrics impregnated with each Example or each Comparative Example and having a resin content of about 55% were prepared and stacked in the order of one copper foil, six prepregs and one copper foil, followed by lamination under vacuum with a lamination pressure of 600 psi at 235° C. for 150 minutes, wherein the peak temperature of lamination is 245° C., to form the copper-containing laminate 2. Insulation layers were formed by laminating six sheets of prepreg between the two copper foils, and the resin content of the insulation layers is about 55%.

4. Copper-free laminate 1 (formed by lamination of two prepregs): Each copper-containing laminate 1 was etched to remove the two copper foils to obtain a copper-free laminate 1 made from laminating two prepregs and having a resin content of about 79%.

5. Copper-free laminate 2 (formed by lamination of six prepregs): Each copper-containing laminate 2 was etched to remove the two copper foils to obtain a copper-free laminate 2 made from laminating six prepregs and having a resin content of about 55%.

For each sample, test items and test methods are described below.

Glass Transition Temperature (Tg)

A copper-free laminate 2 sample (obtained by laminating six prepregs) was subject to the glass transition temperature measurement. The glass transition temperature (in ° C.) of each sample was measured using a dynamic mechanical analysis (DMA) method by reference to IPC-TM-650 2.4.24.4 at a temperature range of 35° C. to 270° C. with a temperature increase rate of 2° C./minute, from which the glass transition temperature (Tg) was obtained. A difference in glass transition temperature of greater than or equal to 5° C. represents a substantial difference (i.e., significant technical difficulty), and a difference in glass transition temperature of less than 5° C. represents no substantial difference.

Difference Rate of Dissipation Factor Caused by Thermal Aging

The aforesaid copper-free laminate 1 (obtained by laminating two prepregs, having a resin content of about 79%) was subject to the measurement of difference rate of dissipation factor caused by thermal aging. Each sample was measured by using a microwave dielectrometer (available from AET Corp.) by reference to JIS C2565 at room temperature (about 25° C.) and under a 10 GHz frequency, from which a first dissipation factor was obtained and defined as Df1. In addition, the sample was then placed at a temperature of 188° C. for 48 hours and then placed at room temperature (about 25° C.) for 1 hour and measured again as described above to obtain a second dissipation factor, which is defined as Df2. The difference rate of dissipation factor caused by thermal aging is defined as the percentage of increase of the second dissipation factor relative to the first dissipation factor. For example, the difference rate of dissipation factor caused by thermal aging is equal to [(Df2-Df1)/Df1]*100%. Lower difference rate of dissipation factor caused by thermal aging is more preferred.

Difference Rate of Dissipation Factor Caused by Moisture and Heat

The aforesaid copper-free laminate 1 (obtained by laminating two prepregs, having a resin content of about 79%) was subject to the measurement of difference rate of dissipation factor caused by moisture and heat. Each sample was measured by using a microwave dielectrometer (available from AET Corp.) by reference to JIS C2565 at room temperature (about 25° C.) and under a 10 GHz frequency, from which a first dissipation factor was obtained and defined as Df3. In addition, the sample was then placed at 85% relative humidity and a temperature of 85° C. for 48 hours and then placed at room temperature (about 25° C.) for 1 hour and measured again as described above to obtain a second dissipation factor, which is defined as Df4. The difference rate of dissipation factor caused by moisture and heat is defined as the percentage of increase of the second dissipation factor relative to the first dissipation factor. For example, the difference rate of dissipation factor caused by moisture and heat is equal to [(Df4-Df3)/Df3]*100%. Lower difference rate of dissipation factor caused by moisture and heat is more preferred.

Article Appearance

Figure 2:
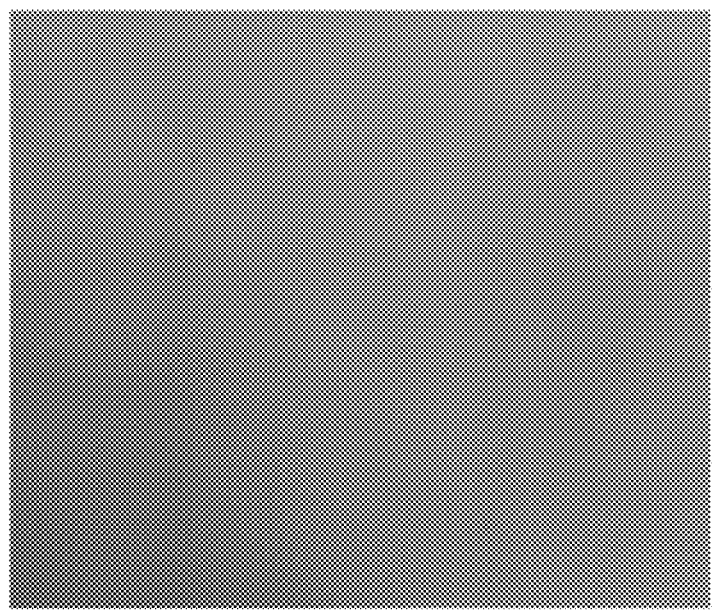
FIG. 2 shows the appearance of a normal laminate.

The aforesaid copper-free laminate 2 (obtained by laminating six prepregs) was subject to visual inspection with naked eyes to determine whether dry board (as illustrated in FIG. 1, forming weave exposure) or uneven thickness of the laminate appeared on the surface of the outmost insulation layer of the copper-free laminate 2. Uneven thickness was determined by evaluating the thickness at 7 points of the copper-free laminate randomly chosen and measured by using a laminate thickness measurement instrument. The standard thickness was 38 mil. Uneven thickness occurred if the thickness measured from any one of the 7 points exceeded f8% of the standard thickness. Absence of dry board or absence of uneven thickness represents normal appearance of the laminate (as illustrated in FIG. 2). A designation of "OK" in the test result was given to represent normal appearance of the laminate. If dry board or uneven thickness occurred, a designation of "dry board" or "uneven thickness" was given.

The following observations can be made according to the test results above.

Resin compositions such as Examples E1 to E16 containing 100 parts by weight of an unsaturated C=C double bond-containing polyphenylene ether resin, 15 parts by weight to 40 parts by weight of a hydrogenated styrene-butadiene-styrene triblock copolymer, 1 part by weight to 20 parts by weight of a compound of Formula (1) and 0.001 part by weight to 0.5 part by weight of a compound of Formula (2), a compound of Formula (3), a compound of Formula (4) or a combination thereof, can all achieve a glass transition temperature of greater than or equal to 180° C., a difference rate of dissipation factor caused by thermal aging of less than or equal to 90%, a difference rate of dissipation factor caused by moisture and heat of less than or equal to 30% and a laminate appearance without dry board and uneven thickness.

In contrast to Examples E1 to E16, resin compositions of Comparative Examples C1 and C2 fail to meet 1 part by weight to 20 parts by weight of the compound of Formula (1) and Comparative Examples C3 to C5 contain a component different from the compound of Formula (1) as the initiator, and all these Comparative Examples fail to achieve improvements in glass transition temperature, difference rate of dissipation factor caused by thermal aging and difference rate of dissipation factor caused by moisture and heat.

In contrast to Examples E1 to E16. Comparative Example C6 contains the compound of Formula (1) in conjunction with dicumyl peroxide as the initiator, instead of using the compound of Formula (2), the compound of Formula (3), the compound of Formula (4) or a combination thereof, and therefore fails to achieve improvements in glass transition temperature, difference rate of dissipation factor caused by thermal aging, difference rate of dissipation factor caused by moisture and heat and laminate appearance.

In contrast to Examples E1 to E16, resin compositions of Comparative Examples C7 and C8 fail to meet 0.001 part by weight to 0.5 part by weight of the compound of Formula (2), the compound of Formula (3), the compound of Formula (4) or a combination thereof, and therefore fails to achieve improvements in glass transition temperature, difference rate of dissipation factor caused by thermal aging, difference rate of dissipation factor caused by moisture and heat and laminate appearance.

In contrast to Examples E1 to E16, Comparative Examples C9 and C10 contain the compound of Formula (1) in conjunction with 1,4-naphthoquinone or 4-t-butylcatechol, instead of using the compound of Formula (2), the compound of Formula (3), the compound of Formula (4) or a combination thereof, and therefore fail to achieve improvements in glass transition temperature, difference rate of dissipation factor caused by thermal aging and difference rate of dissipation factor caused by moisture and heat.

In contrast to Examples E1 to E16, Comparative Example C11 contains polybutadiene instead of the hydrogenated styrene-butadiene-styrene triblock copolymer and therefore fails to achieve improvements in glass transition temperature, difference rate of dissipation factor caused by thermal aging and difference rate of dissipation factor caused by moisture and heat.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, w % bile at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising:
   (A) 100 parts by weight of an unsaturated C=C double bond-containing polyphenylene ether resin;
   (B) 15 parts by weight to 40 parts by weight of a hydrogenated styrene-butadiene-styrene triblock copolymer;
   (C) 1 part by weight to 20 parts by weight of a compound of Formula (1);
   (D) 0.001 part by weight to 0.5 part by weight of a compound of Formula (2), a compound of Formula (3), a compound of Formula (4) or a combination thereof; and
   (E) 80 parts by weight to 270 parts by weight of spherical silica;

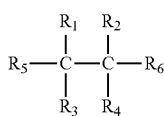

Formula (1)

wherein $R_1$ to $R_4$ are independently a hydrogen atom, a C1-C3 alkyl group, a phenyl group or a C1-C3 alkyl group-substituted phenyl group; and $R_5$ and $R_6$ are independently a phenyl group or a C1-C3 alkyl group-substituted phenyl group;

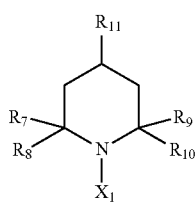

Formula (2)

wherein $X_1$ is an oxygen radical or a hydroxyl group; $R_7$ to $R_{10}$ are independently a hydrogen atom or a C1-C5 alkyl group, and $R_7$ to $R_{10}$ are not a hydrogen atom at the same time;
and $R_{11}$ is a hydrogen atom, a methyl group, an amino group, a hydroxyl group, a carbonyl group or a carboxyl group;

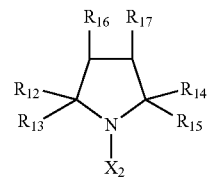

Formula (3)

wherein $X_2$ is an oxygen radical or a hydroxyl group; $R_{12}$ to $R_{15}$ are independently a hydrogen atom or a C1-C5 alkyl group, and $R_{12}$ to $R_{15}$ are not a hydrogen atom at the same time;
and $R_{16}$ and $R_{17}$ are independently a hydrogen atom, a methyl group, an amino group, a hydroxyl group, a carbonyl group or a carboxyl group, or $R_{16}$ and $R_{17}$ together define a benzene ring structure;

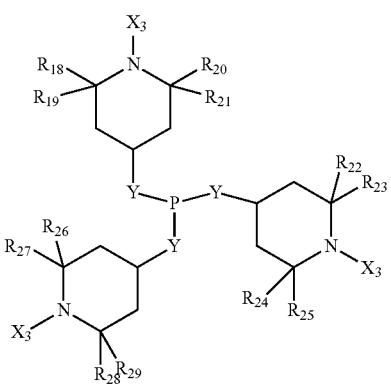

Formula (4)

wherein $X_3$ each independently is an oxygen radical or a hydroxyl group; Y is an oxygen atom or a phenylene group; and $R_{18}$ to $R_{29}$ are independently a hydrogen atom or a C1-C5 alkyl group, and $R_{18}$ to $R_{29}$ are not a hydrogen atom at the same time.

2. The resin composition of claim 1, wherein the unsaturated C=C double bond-containing polyphenylene ether resin comprises a vinylbenzyl-containing biphenyl polyphenylene ether resin, a methacrylate-containing polyphenylene ether resin, a vinylbenzyl-containing bisphenol A polyphenylene ether resin, a chain-extended vinyl-containing polyphenylene ether resin or a combination thereof.

3. The resin composition of claim 1, wherein the hydrogenated styrene-butadiene-styrene triblock copolymer comprises an unsubstituted hydrogenated styrene-butadiene-styrene triblock copolymer, a maleic anhydride-substituted hydrogenated styrene-butadiene-styrene triblock copolymer or a combination thereof.

4. The resin composition of claim 1, wherein the compound of Formula (1) comprises a compound of Formula (1-1), a compound of Formula (1-2), a compound of Formula (1-3) or a combination thereof:

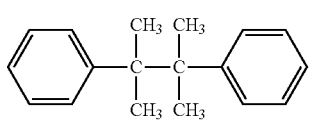

Formula (1-1)

Formula (1-2)

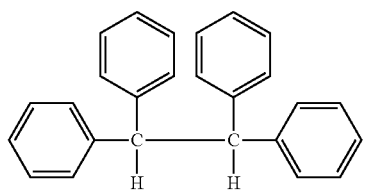

Formula (1-3)

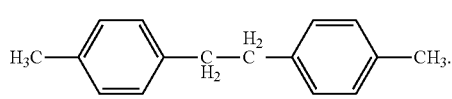

5. The resin composition of claim 1, wherein the compound of Formula (2) comprises a compound of Formula (2-1), a compound of Formula (2-2), a compound of Formula (2-3), a compound of Formula (2-4), a compound of Formula (2-5) or a combination thereof:

Formula (2-1)

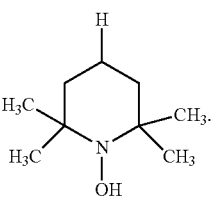

Formula (2-2)

Formula (2-3)

Formula (2-4)

Formula (2-5)

6. The resin composition of claim 1, wherein the compound of Formula (3) comprises a compound of Formula (3-1), a compound of Formula (3-2), a compound of Formula (3-3), a compound of Formula (3-4) or a combination thereof:

Formula (3-1)

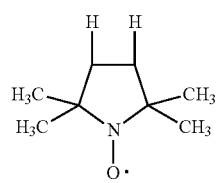

Formula (3-2)

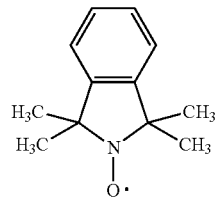

Formula (3-3)

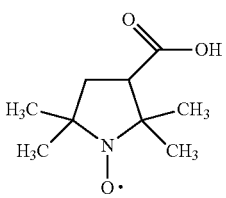

Formula (3-4)

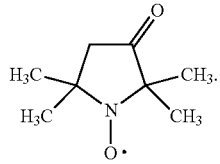

7. The resin composition of claim 1, wherein the compound of Formula (4) comprises a compound of Formula (4-1), a compound of Formula (4-2), a compound of Formula (4-3) or a combination thereof:

Formula (4-1)

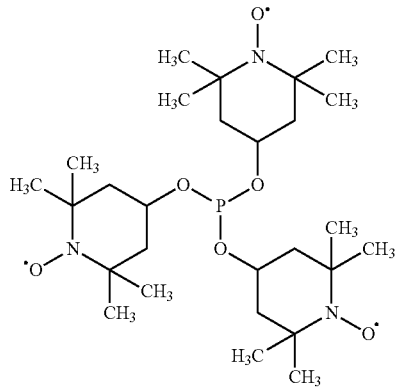

Formula (4-2)

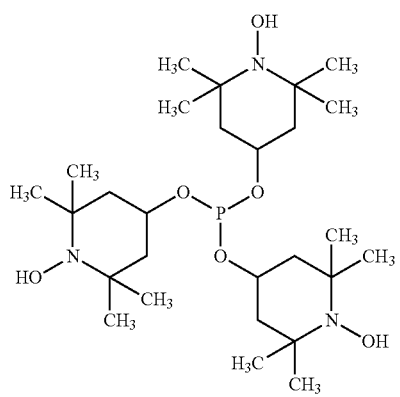

Formula (4-3)

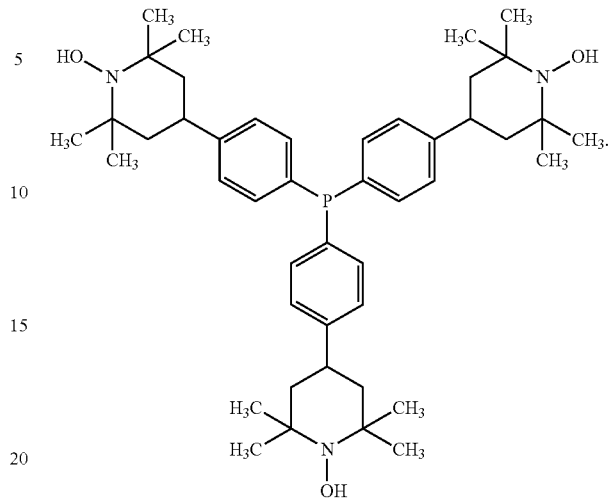

8. The resin composition of claim 1, further comprising 5 parts by weight to 25 parts by weight of triallyl isocyanurate.

9. The resin composition of claim 1, further comprising solvent, flame retardant, silane coupling agent, coloring agent, core-shell rubber or a combination thereof.

10. An article made from the resin composition of claim 1, comprising a prepreg, a resin film, a laminate or a printed circuit board.

11. The article of claim 10, having a glass transition temperature as measured by reference to IPC-TM-650 2.4.24.4 of greater than or equal to 180° C.

12. The article of claim 10, having a difference rate of dissipation factor of less than or equal to 90% calculated according to a dissipation factor as measured by reference to JIS C2565 at 10 GHz after being subject to standing still at 188° C. for 48 hours.

13. The article of claim 10, having a difference rate of dissipation factor of less than or equal to 30% calculated according to a dissipation factor as measured by reference to JIS C2565 at 10 GHz after being subject to standing still at 85° C. and a relative humidity of 85% for 48 hours.

* * * * *